May 15, 1956 A. HAHNEL 2,745,963

FREQUENCY MULTIPLIER

Filed May 4, 1955

*INVENTOR.*
ALWIN HAHNEL
*BY* Harry M. Saragovitz
*ATTORNEY*

United States Patent Office 2,745,963

Patented May 15, 1956

2,745,963

FREQUENCY MULTIPLIER

Alwin Hahnel, Little Silver, N. J., assignor to the United States of America as represented by the Secretary of the Army Application May 4, 1955, Serial No. 506,098

6 Claims. (Cl. 250—36)

(Granted under Title 35, U. S. Code (1952), sec. 266)

The invention described herein may be manufactured and used by or for the Government for governmental purposes, without the payment of any royalty thereon.

This invention relates to frequency spectrum generators and more particularly to frequency multipliers utilizing crystal stabilized periodically phase controlled oscillators.

The usual procedure in frequency multiplication by means of electron discharge devices comprising several electrodes consists in designing the electron discharge device as an amplifier and in tuning its output to a frequency $nf$ of which is a harmonic of the excitation frequency. These different harmonics vary very greatly in amplitude, being generally of much greater amplitude at the lower harmonic frequencies than at the higher harmonic frequencies. Hence the multiplication systems used heretofore required a large number of stages to provide any extended factor of multiplication. Moreover, in such systems the isolation of the harmonic frequencies from the many spurious oscillations and unwanted harmonics becomes very complicated and is difficult to achieve.

It is therefore an object of the present invention to provide a spectrum generator wherein the selection of any high order multiplication factor is readily accomplished by the tuning of a single resonance circuit.

It is another object of the present invention to provide a spectrum generator wherein two differently spaced crystal controlled frequency spectra of harmonically related frequencies are provided.

It is yet another object of the invention to provide a sprectrum generator wherein the selection of a high order multiplication factor is readily accomplished by the tuning of a single resonance circuit and in which the selection of one of two available fundamental frequecies does not require any retuning or switching of the tuned circuits associated with the fundamental frequencies.

In accordance with the present invention there is provided a frequency multiplier comprising a vacuum tube having at least a plate, a grid, and a cathode. Included also are discrete means adapted to generate radio-frequency energy at a first and second fundamental frequency having a relatively large frequency ratio, preferably of at least 1 to 10, and three discrete resonant means in series circuit with the plate. Two of the discrete resonant means are tuned respectively to the first and second fundamental frequency and the third is tuned approximately to a prescribed frequency which is a harmonic of the fundamental frequency selected for operation. Also included are means for selectively connecting either of the discrete fundamental frequency generating means in circuit with the grid whereby the prescribed frequency is keyed only at the selected fundamental frequency to produce a frequency spectrum wherein only the frequency harmonically related to the selected fundamental frequency and substantially equal to the prescribed frequency is at maximum amplitude.

For a better understanding of the invention together with other and further objects thereof, reference is had to the following description taken in connection with the accompanying drawing in which.

Figure 1:
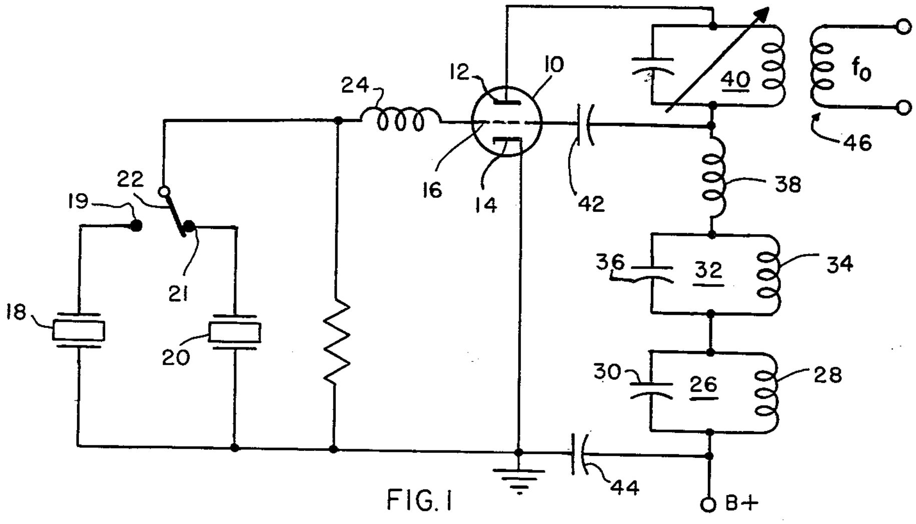
Figure 1 is a schematic diagram of the invention.

Referring now to Figure 1 of the drawing, the frequency spectrum generator shown therein comprises an electron discharge device 10 having a plate 12, a cathode 14 and a control grid 16. Grid 16 is connected in series to either one of two piezoelectric crystals 18 or 20 through switch arm 22 and choke coil 24. As shown, piezoelectric crystal 18 is connected between one switch terminal 19 and ground and piezoelectric crystal 20 is connected between the other switch terminal 21 and ground. The piezoelectric crystals generate discrete first and second fundamental frequencies, designated as $f_1$ and $f_2$, having a relatively large frequency ratio. Connected serially between B+ and plate 12 are a first resonant circuit 26 comprising the parallel arrangement of inductance 28 and capacitor 30; a second resonant circuit 32 comprising the parallel arrangement of inductance 34 and capacitor 36, an isolation coil 38, and a conventional resonant circuit 40 adapted to be tunable through a prescribed range of frequencies. The junction of circuit 40 and isolation coil 38 is coupled to grid 16 through capacitor 42. The values of inductance 28 and capacitor 30 are such that circuit 26 is adapted to be resonant at fundamental frequency $f_1$ and the values of inductance 34 and capacitor 36 are such that resonant circuit 32 is adapted to be resonant at fundamental frequency $f_2$. It is to be understood of course that the circuits 26 and 32 may be interchanged without affecting the operation of the invention. Resonant circuit 40 is tuned to a preselected frequency $F=nf_1$ or $n_2f_2$, $n_1f_1$ and $n_2f_2$ respectively being a desired output frequency $f_0$ of either of the fundamental frequencies $f_1$ or $f_2$. Cathode 14 is connected to ground as shown and is connected to B+ through blocking capacitor 44. To distinguish between preselected or prescribed frequency F and the desired multiple frequency $f_0=n_1f_1$ or $n_2f_2$, $f_0$ will hereinafter be referred to as the output frequency. With the arrangement hereinabove described, the resonant circuit 40 is in the anode-grid circuit of tube 10 and it is coupled conventionally to an output circuit 46 which provides an output of only the desired output frequency $f_0$. Regenerative feedback at both the preselected frequency F and either of the two operating fundamental frequencies $f_1$ or $f_2$ is provided from plate 12 to grid 16 in the same manner as in conventional oscillators.

Figures 2, 6:
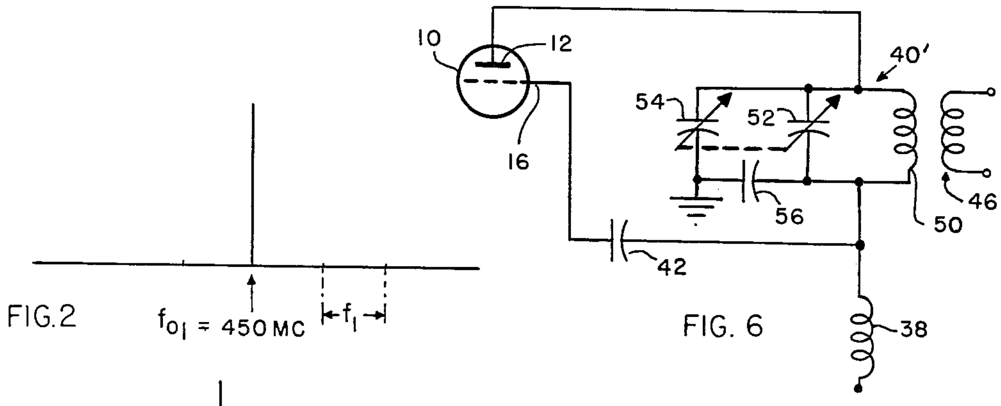
Figures 2 and 3 illustrate the oscillator mode of operation of the circuit in Figure 1.
Figure 6 shows an alternate resonant circuit which may be included in the circuit of Figure 1.
Figure 3:
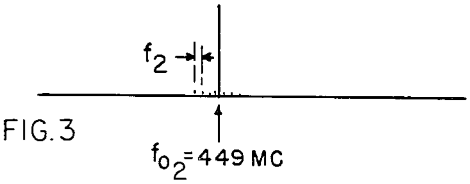

In considering the operation of Figure 1 as a frequency multiplier viz., oscillator mode of operation, let it be assumed that crystal 18 generates the higher frequency $f_1$ and is in circuit with grid 16 through switch 22, and that circuit 40 is tuned to $F=n_1f_1=f_0$. For purposes of explanation, let it be assumed that $f_1=10$ mc.; $f_2=1$ mc.; $F=449$ mc., and an output of exactly 450 mc. is desirable. The frequency output $f_1$ from piezoelectric crystal 18 provides a keying voltage waveform that is repetitive at frequency $f_1$ and is generated in tube 10 simultaneously with the preselected frequency F. The oscillation voltage applied to grid 16 from crystal 18 may be considered to provide a bias such that there is a regenerative and a degenerative period for the preselected frequency F with constant amplitude oscillation in between. Thus the preselected oscillation at frequency F is keyed and phase controlled such that its output waveform is periodic at the fundamental frequency $f_1$. For the oscillator mode of operation, the output energy from resonant circuit 40 is concentrated at the desired multiple frequency $f_0=n_1f_1=450$ mc. This output is shown in Figure 2. By such an arrangements the output frequency from circuit 46 is an exact harmonic, or multiple, of the fundamental frequency. The frequency $F=449$ mc. does not appear in the output circuit 46 inasmuch as this preselected frequency is periodically phase controlled at the fundamental frequency $f_1$. This is a well known principle and it is believed no further description is necessary. With switch 22 now connected so that crystal 20 (frequency $f_2$) is in series with the grid circuit, then the output energy from the resonant circuit 40 will be concentrated at 449 mc., as shown in Figure 3. If now a frequency of 445 mc., for example, should be desired, then resonant circuit 40 must be returned to the vicinity of 445 mc. and the 1 mc. crystal selected as the fundamental frequency to provide 1 mc. channel spacing. The change from frequency $f_1=10$ mc. to a frequency $f_2=1$ mc. permits the use of the described oscillator for the generation of exact harmonics of 1 mc. even if the initial inaccuracy of tuned circuit 40 is larger than 1 mc. Thus any high order of multiplication factor may be achieved in which the selection of one of two available fundamental frequencies does not require any returning or switching of the circuits 26 and 32 which are respectively tuned to the fundamental frequencies. Of course, it is to be understood that the amplitude of the $f_1$ and $f_2$ oscillations should be adjusted so that they are large enough to secure phase control of prescribed frequency F and thereby provide the essential periodicity of the output wave form at the frequency of the operating crystal.

Figure 6 illustrates a resonant circuit 40′ which may be substituted for the circuit 40 of Figure 1 to produce maximum suppression of the undesired harmonics that appears adjacent the desired multiple output frequency $f_0$. As shown, the resonant circuit 40′ comprises the parallel circuit arrangement of inductance 50 and tuning capacitor 52, and a series capacitor voltage divider circuit 54 and 56 connected across the parallel arrangement. The junction of capacitors 54 and 56 is connected to ground and capacitor 54 is mechanically coupled or ganged to tuning capacitor 52. By such an arrangement, a relatively small but constant negative feedback resistance is maintained over a wide frequency range to obtain an optimum output wave form. The theoretical optimum would be a wave form where the time required for the regenerative or build-up period and the degenerative or decay period of the oscillation is negligible compared to the time during which the oscillator operates at constant amplitude.

Figure 4:
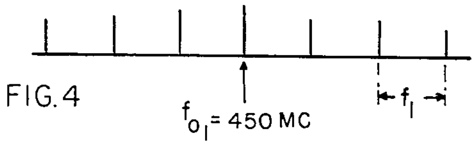
Figures 4 and 5 illustrate the spectrum generator mode of operation of the circuit of Figure 1.
Figure 5:
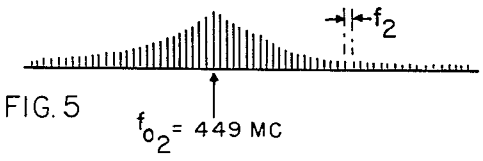

To operate in the spectrum generator mode, all that is necessary is to load resonant circuit 40 with a resistor connected across the circuit. With such an arrangement, Figure 4 shows the output with crystal 20 in the circuit. As an oscillator, the circuit shown in Figure 1 is capable of delivering directly and without the need of selective amplification harmonic frequency components which have a substantial amplitude at any selected one of the many available frequencies. The order of the selected harmonic may be as high as 500. Suppression of the undesired adjacent harmonics up to 30 db have been obtained. The circuit of Figure 1 has the further advantage in that its output energy at a selected frequency is much larger than that produced by any other type harmonic generator of comparable simplicity.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency multiplier comprising a vacuum tube having at least a plate, a cathode and a grid, discrete means adapted to generate radio-frequency energy at a first and second fundamental frequency having a relatively high frequency ratio, three discrete resonant means in series circuit with said plate, two of said discrete resonant means being tuned respectively to said first and second fundamental frequency, the third of said discrete resonant means being tuned to a prescribed frequency which is substantially an harmonic of one of said fundamental frequencies, and means for selectively connecting either of said discrete fundamental frequency generating means in circuit with said grid whereby said prescribed frequency is keyed only at the selected fundamental frequency to produce a frequency spectrum wherein only the frequency harmonically related to said selected fundamental frequency and substantially equal to said prescribed frequency is at maximum amplitude.

2. The frequency multiplier in accordance with claim 1 wherein said first and second fundamental radio frequency generating means are piezoelectric crystals.

3. The frequency multiplier in accordance with claim 1 wherein said third resonant circuit is connected between said grid and said plate.

4. The frequency multiplier in accordance with claim 1 wherein the said frequency ratio is at least 1 to 10.

5. A frequency multiplier comprising a vacuum tube having at least a plate, a cathode and a grid, a first and second piezoelectric crystal adapted to generate radio-frequency energy at first and second fundamental frequencies having a relatively high frequency, three discrete resonant means in series circuit with said plate, two of said discrete resonant means being tuned respectively to said first and second fundamental frequency, the third of said discrete resonant means being tuned to a prescribed frequency which is substantially an harmonic of one of said fundamental frequencies, and means for selectively connecting either of said crystals in circuit with said grid whereby said prescribed frequency is keyed only at the selected fundamental frequency to produce a frequency spectrum wherein only the frequency harmonically related to said selected fundamental frequency and substantially equal to said prescribed frequency is at maximum amplitude.

6. A frequency multiplier comprising a vacuum tube having at least a plate, a cathode and a grid, a first and second piezoelectric crystal adapted to generate radio-frequency energy at a first and second fundamental frequency having a relatively high frequency ratio, a source of positive direct-current potential, a pair of serially connected parallel resonant circuits, one end of said serially connected circuits being capacitively coupled to said grid and the other end thereof connected to said positive potential source, one of said parallel resonant circuits being tuned to one fundamental frequency and the other of said parallel resonant circuits being tuned to the other fundamental frequency, a third resonant circuit connected between said plate and said one end adapted to be tuned to a prescribed frequency which is a harmonic of one of said fundamental frequencies, and means for selectively connecting either of said piezoelectric crystals in circuit with said grid.

No references cited.